United States Patent
Scofield et al.

(10) Patent No.: US 11,115,224 B1
(45) Date of Patent: Sep. 7, 2021

(54) ACCESS CONTROL SYSTEM

(71) Applicant: Amazon Technologies, Inc., Seattle, WA (US)

(72) Inventors: Ian Scofield, Auburn, WA (US); Scott Bradley Ward, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 307 days.

(21) Appl. No.: 16/000,788

(22) Filed: Jun. 5, 2018

(51) Int. Cl.
 *H04L 29/06* (2006.01)
 *H04L 9/32* (2006.01)
 *H04L 9/08* (2006.01)

(52) U.S. Cl.
 CPC .......... *H04L 9/3268* (2013.01); *H04L 9/0825* (2013.01); *H04L 9/0891* (2013.01); *H04L 9/3247* (2013.01); *H04L 63/0823* (2013.01); *H04L 63/10* (2013.01)

(58) Field of Classification Search
 CPC ... H04L 9/3268; H04L 9/3271; H04L 9/3273; H04L 9/0825; H04L 9/0823; H04L 9/3247; H04L 9/3263; H04L 63/08; H04L 63/10; H04L 9/0891
 See application file for complete search history.

(56) References Cited

U.S. PATENT DOCUMENTS

| | | | | |
|---|---|---|---|---|
| 6,883,100 B1* | 4/2005 | Elley | .................. | G06F 21/6218 726/5 |
| 7,735,120 B2* | 6/2010 | Wallace | ................. | H04L 63/08 726/5 |
| 8,146,142 B2* | 3/2012 | Lortz | ..................... | G06F 21/43 726/6 |
| 8,510,812 B2* | 8/2013 | Krywaniuk | ............ | H04L 41/00 726/6 |
| 8,842,841 B2* | 9/2014 | Hook | .................... | H04L 9/0894 380/284 |
| 10,136,315 B2* | 11/2018 | Gong | .................. | H04L 63/0869 |
| 2012/0084850 A1* | 4/2012 | Novak | ................. | G06F 21/575 726/8 |
| 2016/0344559 A1* | 11/2016 | Ma | ....................... | H04L 9/3263 |

* cited by examiner

*Primary Examiner* — Hosuk Song
(74) *Attorney, Agent, or Firm* — Davis Wright Tremaine LLP

(57) ABSTRACT

A system provides credential management for computer systems and services within a customer data center by acting as an intermediary to an authentication service of a computing resource service provider. In an embodiment, an application server hosts an agent that is registered as a trusted provider of credentials. In an embodiment, the agent is cryptographically linked to the application server using a digital certificate. In an embodiment, the agent uses the digital certificate to authenticate with a credential server, and the credential server provides short-term credentials that may be used to access services of the computing resource service provider. In an embodiment, the short-term credentials are transmitted from the credential server to the agent, and the agent provides the credentials to one or more applications running on the application server. In an embodiment, the credentials allow the applications to access the services of the computing resource service provider.

21 Claims, 10 Drawing Sheets

ACCESS CONTROL SYSTEM

BACKGROUND

Computing resource service providers have become an important part of the computing infrastructure for many data centers. For example, a business may operate a number of server computer systems that perform billing, warehouse management, and automation functions, but some of the computing resources, such as data storage, key management, or even processing capability, may be provided via an online service operated by a computing resource service provider. When using online services, the user generally provides some form of credential associated with an account of the computing resource service provider. This allows the computing resource service provider to authenticate the user and authorize any requests. As a result, in many examples, each application or service that uses a service of the computing resource service provider maintains a copy of the customer's account credentials. This can make it difficult to manage the customer's account credentials because, for example, rotating the credentials generally requires updating the copies stored by all of the various applications and services. Therefore, distributing and managing the credentials throughout the customer data center in a secure way is an important problem.

BRIEF DESCRIPTION OF THE DRAWINGS

Various techniques will be described with reference to the drawings, in which.

DETAILED DESCRIPTION

Figure 1:
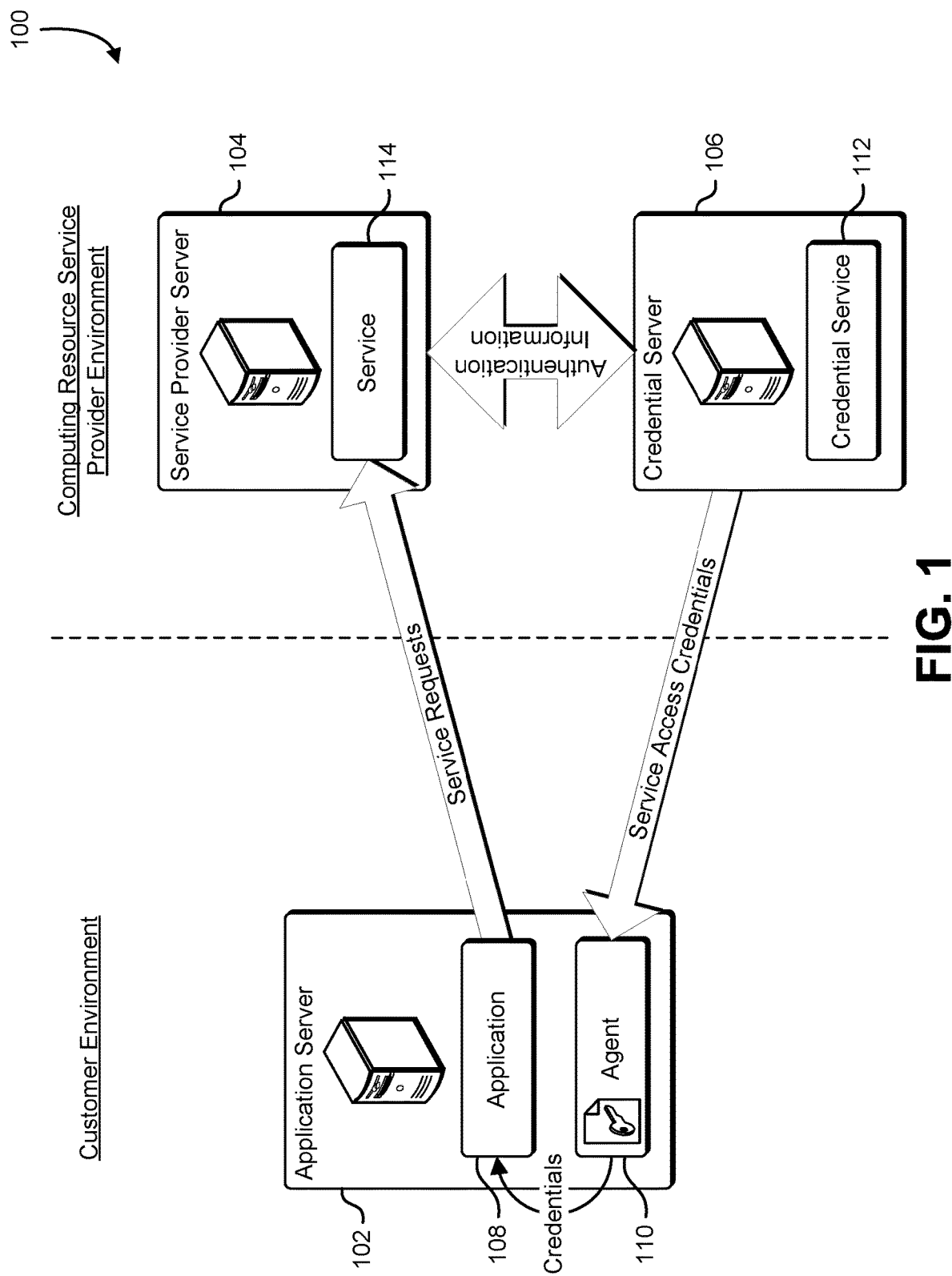
FIG. 1 shows an illustrative example of a system that provides credentials to an application running in a customer environment, where the credentials allow the application to access a service provided by a computing resource service provider, in an embodiment.

The present document describes a system that provides credential management for computer systems and services within a customer data center by acting as an intermediary to an authentication service of a computing resource service provider. In an embodiment, an agent is hosted on an application server that resides in the customer data center. In an embodiment, the computing resource service provider registers the agent as a trusted provider of credentials and cryptographically links the agent to the application server using a digital certificate. In an embodiment, the agent uses the digital certificate to authenticate with an authentication service of the computing resource service provider, and the authentication service provides short-term credentials that may be used to access services of the computing resource service provider. In an embodiment, the short-term credentials are transmitted from the authentication service to the agent, and the agent relays the credentials to an application running on the application server. In an embodiment, applications running in the customer environment can easily require credentials that allow access to services provided by the computing resource service provider, and the agent handles the tasks of authenticating with the computing resource service provider, obtaining the temporary credentials, and managing the distribution of those credentials.

In various embodiments, customers may use the services of a computing resource service provider for a variety of purposes. In an embodiment, customers access the services of a computing resource service provider from an application hosted within the customer's own computing infrastructure. In an embodiment, the application may have an associated user identity, access profile, and access keys with which to sign calls to the computing resource service provider's services. This may put an additional burden on the application developer, as the application generally implements security mechanisms to safeguard and manage such keys, in an embodiment.

In an embodiment, the application accesses a remote storage service provided by the computing resource service provider. In an embodiment, the remote storage service allows the application to backup and store application data to a remote service operated by the computing resource service provider. In an embodiment, by providing temporary credentials to each application, it is unnecessary to provide each application with a general credential allowing access to the customer's account on the computing resource service provider. In an embodiment, the excess role associated with the temporary credentials may be tailored to prevent general access to the customer account, and limit use of the temporary credential to a particular subnet or a particular machine.

In an embodiment, the system includes an agent running on an application server outside the environment of the computing resource service provider, such as a server in the customer's data center, and the system also includes a credential server operated by the computing resource service provider.

In an embodiment, the agent registers with the credential server by providing a pair of cryptographic keys and information that describes the application server on which the agent runs. In an embodiment, the information may include information from a trusted platform module ("TPM"), a processor ID, network address information, memory and configuration information, or other information associated with the application server. In an embodiment, the credential server authenticates the information provided by the agent, and generates a digital certificate based on the information provided which binds the certificate to the application server. In an embodiment, the digital certificate is associated with a security role. In an embodiment, the security role defines a set of service access permissions that may be granted to the agent. In an embodiment, the digital certificate and its associated security role are stored in a trust store maintained by the credential server, and a copy of the digital certificate is provided to the agent.

In an embodiment, the agent acquires credentials by providing the digital certificate and authentication information to the credential server. In an embodiment, the credential server authenticates the agent and identifies the security role associated with the provided digital certificate. In an embodiment, the credential server generates a set of temporary credentials that may be used to grant permissions associated with the security role, and provides the temporary credentials to the agent.

In an embodiment, the agent makes the set of temporary credentials accessible to applications running on the application server. In an embodiment, the temporary credentials are stored in an environment variable that is readable to applications running on the application server. In an embodiment, applications that wish to make calls to services of the computing resource service provider, read temporary credentials from the environment variable, and use the temporary credentials to authorize service requests which are sent to services of the computing resource service provider. In an embodiment, the temporary credentials provide a cryptographic key which is used by the application to generate a digital signature for service requests submitted to the service, and the digital signature is verified by the receiving service to authorize the request.

In an embodiment, the certificate is generated by the credential service and provided to the customer. In an embodiment, the customer installs the certificate on the application server, and upon installing the certificate, the certificate is signed and bound to the specific device on which it is installed. In an embodiment, the registration information is then synced with the credential service and can no longer be altered. In an embodiment, if an entity attempts to modify the certificate or to use the certificate on another device detected by the agent by way of a digital signature on the digital certificate, the certificate is no longer valid.

In an embodiment, a customer is able to associate a security role with a digital certificate when the certificate is created. In an embodiment, a security role describes a particular set of access permissions to services provided by the computing resource service provider. In an embodiment, the customer may create new certificates, renew old certificates, or revoke certificates by removing them from the trust store on the credential server.

As one skilled in the art will appreciate in light of this disclosure, certain embodiments may be capable of achieving certain advantages, including some or all of the following: (1) the system eliminates the need for customers to generate and store access keys, (2) the system accomplishes this while still allowing the customer to have the ability to access services of the computing resource service provider from applications running in the customer's own infrastructure or other services that are running outside the computing resource service provider.

FIG. 1 shows an illustrative example of a system 100 that provides credentials to an application running in a customer environment, where the credentials allow the application to access a service provided by a computing resource service provider, in an embodiment. In an embodiment, the system includes an application server 102 operating in a customer environment, and a service provider server 104 and the credential server 106 operating in a computing resource service provider environment. In an embodiment, the computing resource service provider environment comprises a trusted network operating behind a firewall controlling access to the Internet, and the customer environment is a customer data center connected to the Internet. In an embodiment, the application server 102 is a computer system, computer server, or virtual computer system that hosts a customer application 108 and an agent 110. In an embodiment, the application 108 is a set of instructions stored in memory on the application server 102 that, when executed by a processor of the application server 102, cause the application server 102 to perform various business operations defined by the customer. In an embodiment, the business operations include one or more requests which are submitted to a service provided by the computing resource service provider. In an embodiment, the requests may be Web requests, remote procedure calls, or network based request. In an embodiment, the agent 110 is a set of instructions stored in memory on the application server 102 that, as a result of being executed by the processor of the application server 102, cause the application server 102 to acquire credentials allowing the application 108 to access a service of the computing resource service provider.

In an embodiment, the service provider server 104 is a computer system, computer server, computer cluster, virtual computer system, execution runtime environment, computing appliance, or computing service that hosts a service 114. In an embodiment, the service is comprised of executable instructions stored in a memory associated with the service provider server 104 that, as a result of being executed by the service provider server 104 provide a service to customers of the online service provider such as a data storage service, a cryptography service, a key management service, a virtual computing service, or other service. In an embodiment, the service is a web service that is accessible via the Internet.

In an embodiment, the credential server 106 is a computer system, computer server, computer cluster, virtual computer system, execution runtime environment, computing appliance, or computing device that hosts a credential service 112. In an embodiment, the credential services is a set of executable instructions that, as a result of being executed by a processor of the credential server 106, cause the credential server to provide short-term credentials to the agent 110. In an embodiment, the short-term credentials may be relayed to an application and used to access the service 114. In an embodiment, authentication information is exchanged between the credential server 106 and the service provider server 104, allowing the credential server 106 to issue credentials that allow access to the service 114.

In an embodiment, in order to authorize the application 108 to access the service 114, a customer authenticates with the credential server 106 and requests a digital certificate, specifying a security role to be associated with the digital certificate that has sufficient permissions for the application 108. In an embodiment, the credential server 106 generates a digital certificate and provides the digital certificate to the customer. In an embodiment, the customer provides information identifying the application server 102 to the credential server 106 with the request, and the credential server 106 incorporates this information into the digital certificate cryptographically binding the digital certificate to the application server 102. In an embodiment, the digital certificate is provided to the agent 110, and the agent initializes the digital certificate by retrieving identifying information from the application server 102, and signing the digital certificate with the identifying information to cryptographically bind the digital certificate to the application server 102. In an embodiment, the bound digital certificate is retained by the agent 110 on the application server 102.

In an embodiment, in order to acquire a credential that allows access to the service 114, the agent 110 presents the digital certificate described above to the credential server 106. In an embodiment, the credential server 106 authenticates the agent using the digital certificate and confirms that the digital certificate is associated with a security role. In an embodiment, the credential server 106 generates a temporary credential that allows the holder to assume the security role, and provides the credential to the agent 110. In an embodiment, the agent 110 receives the credential from the credential server 106 and makes the credential available to the application 108. In an embodiment, the agent 110 stores the credential in an environment variable that is accessible to the application 108. In an embodiment, an environment variable is a variable stored in shared memory that is accessible to local processes that are running on the application server 102, such as a Windows environment variable. In an embodiment, the agent 110 provides the credential to the application by writing the application to a configuration memory of the application server such as an INI file or a registry. In another embodiment, the agent 110 provides the credential to the application by publishing the credential to a process, computer system, or set of computer systems in the customer environment.

In an embodiment, the application 108 uses the credential to make service requests to the service 114. In an embodiment, the application reads the credential from an environment variable, INI file, registry, or publication as described above. In an embodiment, the application generates a request, and provides the credential with the request to the service 114. In an embodiment, the credential is a cryptographic key, and the application authorizes the request by signing the request with the cryptographic key.

In an embodiment, performing service requests in this way allows the application 108 to acquire credentials that can be used directly without having to negotiate security roles, or deal with obtaining, storing, or rotating the customer's account credentials. In an embodiment, temporary credentials tailored to the needs of the application 108 can be acquired by way of the agent 110, both increasing the security of the system, and simplifying the request process.

Figure 2:
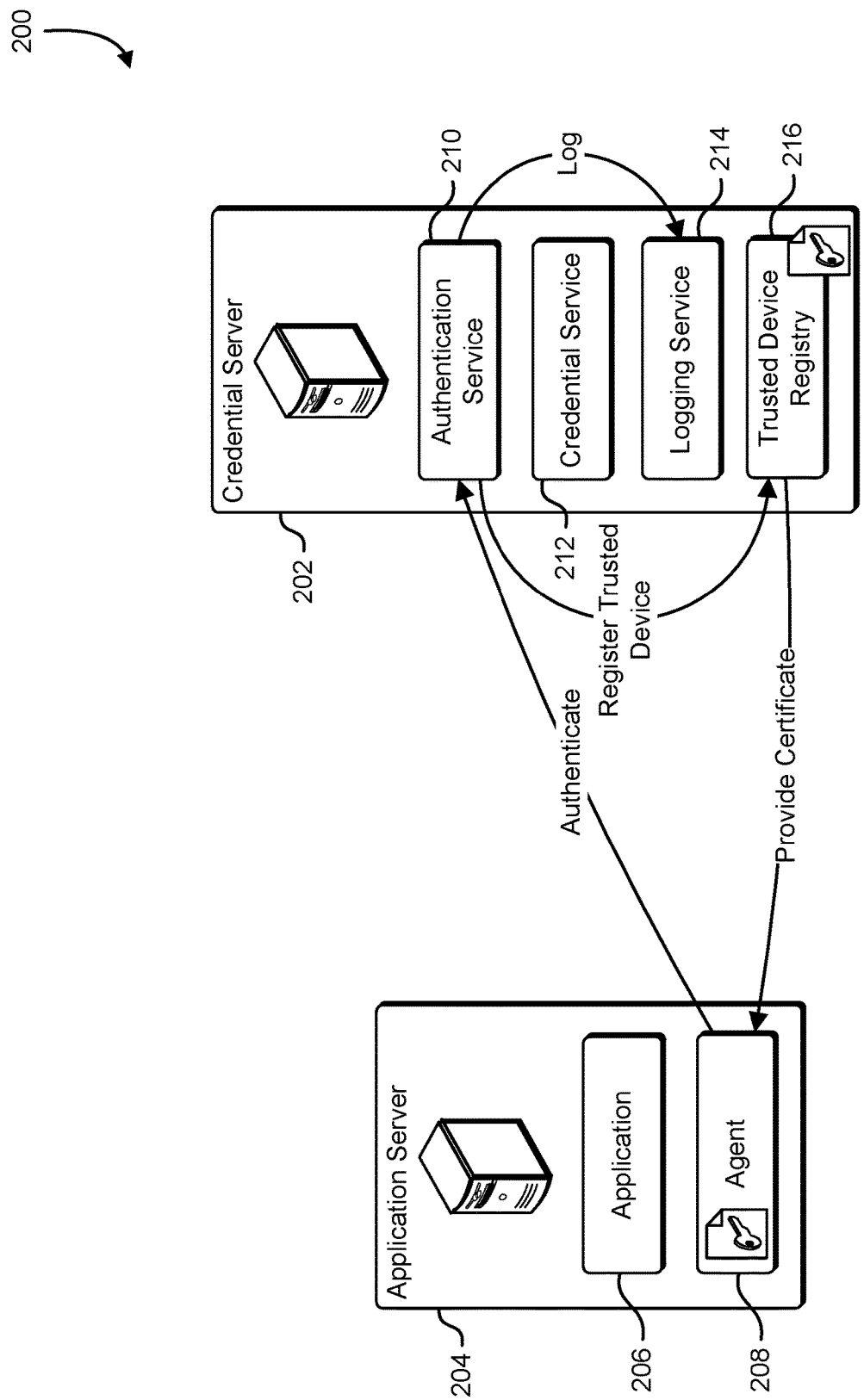
FIG. 2 shows an illustrative example of a system that registers an agent running on a customer's application server as a trusted credential provider, in an embodiment.

FIG. 2 shows an illustrative example of a system 100 that registers an agent running on a customer's application server as a trusted credential provider, in an embodiment. In an embodiment, the system 200 includes a credential server 202 and it application server 204. In an embodiment, the credential server 202 and the application server 204 may be any combination of a computer server, a server cluster, a virtual computer system, a runtime environment, or computing appliance having one or more processors and a memory for holding executable instructions that, when executed on the one or more processors, cause the server to perform various operations. In an embodiment, each server contains various groups of executable instructions that may be arranged according to the operations they cause the server to perform. In the present document, referring to a group of instructions as performing an operation is understood to mean that the group of instructions is executed on a processor, thereby causing a computer system to perform the recited operation.

In an embodiment, the application server 204 hosts an application 206 and an agent 208. In an embodiment, the application 206 is a set of instructions stored in a memory on the application server 204 by a customer, such as a customer application that performs business functions. In an embodiment, the agent 208 is a service installed on the application server 204 that communicates with the credential server 202 to retrieve credentials for use by the application 206. In an embodiment, the application server 204 resides on a customer network and the credential server 202 resides on a network controlled by a computing resource service provider. In an embodiment, the agent 208 establishes communication with the credential server 202 via an intervening computer network such as the Internet. In an embodiment, communication between the agent 208 and the credential server 202 may be encrypted using a secure sockets layer ("SSL") or transport layer security ("TLS") protocol.

In an embodiment, the credential server 202 hosts an authentication service 210, a credential service 212, a logging service 214, and a trusted device registry 216. In an embodiment, the authentication service 210 is a set of computer instructions that cause the credential server 202 to verify the identity of the application server 204 via a digital signature, digital certificate, username and password, token, or other credential. In an embodiment, the credential service 212 is a set of computer instructions that cause the credential server 202 to generate credentials for a service of a computing resource service provider. In an embodiment, the credentials are a cryptographic key, token, short-term credential, or password that allows access to the service. In an embodiment, the logging service 214 records information describing operations performed by the authentication service 210, the credential service 212, and the trusted device registry 216. In an embodiment, the trusted device registry 216 records information that identifies the agent 208 and the application server 204. In an embodiment, the trusted device registry 216 includes information that identifies a security role or set of permissions that are granted to the agent 208.

In an embodiment, in order to obtain and provide credentials to the application 206, the agent 208 registers with the credential server 202. In an embodiment, the agent 208 collects a set of identifying information that identifies the application server 204. In an embodiment, the identifying information includes information provided by a trusted platform module ("TPM"). In an embodiment, the information includes a processor ID, and a fingerprint of the hardware associated with the application server 204. In an embodiment, the hardware may include a memory type and size, a number and size of storage devices, and information based on the hardware configuration of the application server 204. In an embodiment, the agent 208 generates a cryptographic key pair that includes a public key and an associated private key. In an embodiment, the agent 208 provides the identifying information and the public key to the authentication service 210.

In an embodiment, the authentication service 210 verifies the identity of the agent 208 and generates the digital certificate based on the information. In an embodiment, the digital certificate is cryptographically bound to the application server 204 so that the digital certificate may not be used to authenticate a different application server or agent. In an embodiment, the digital certificate is signed using a private cryptographic key of the credential server 202. In an embodiment, the authentication service 210 stores the digital certificate in the trusted device registry 216. In an embodiment, the customer specifies a security role to be associated with the digital certificate and granted to the agent 208. In an embodiment, the authentication service 210 stores information in the trusted device registry 216 that records the Association of the security role with the digital certificate. In an embodiment, the logging service 214 records the generation of the digital certificate and the assignment of the security role to the digital certificate. In an embodiment, the authentication service 210 provides the digital certificate to the agent 208, and the agent 208 stores the digital certificate.

In an embodiment, the digital certificate may be used by the agent 208 at a later time to acquire credentials which may be provided to the application 206. In an embodiment, the credentials may be used by the application 206 to access services of the computing resource service provider in accordance with the security role associated with the certificate.

Figure 3:
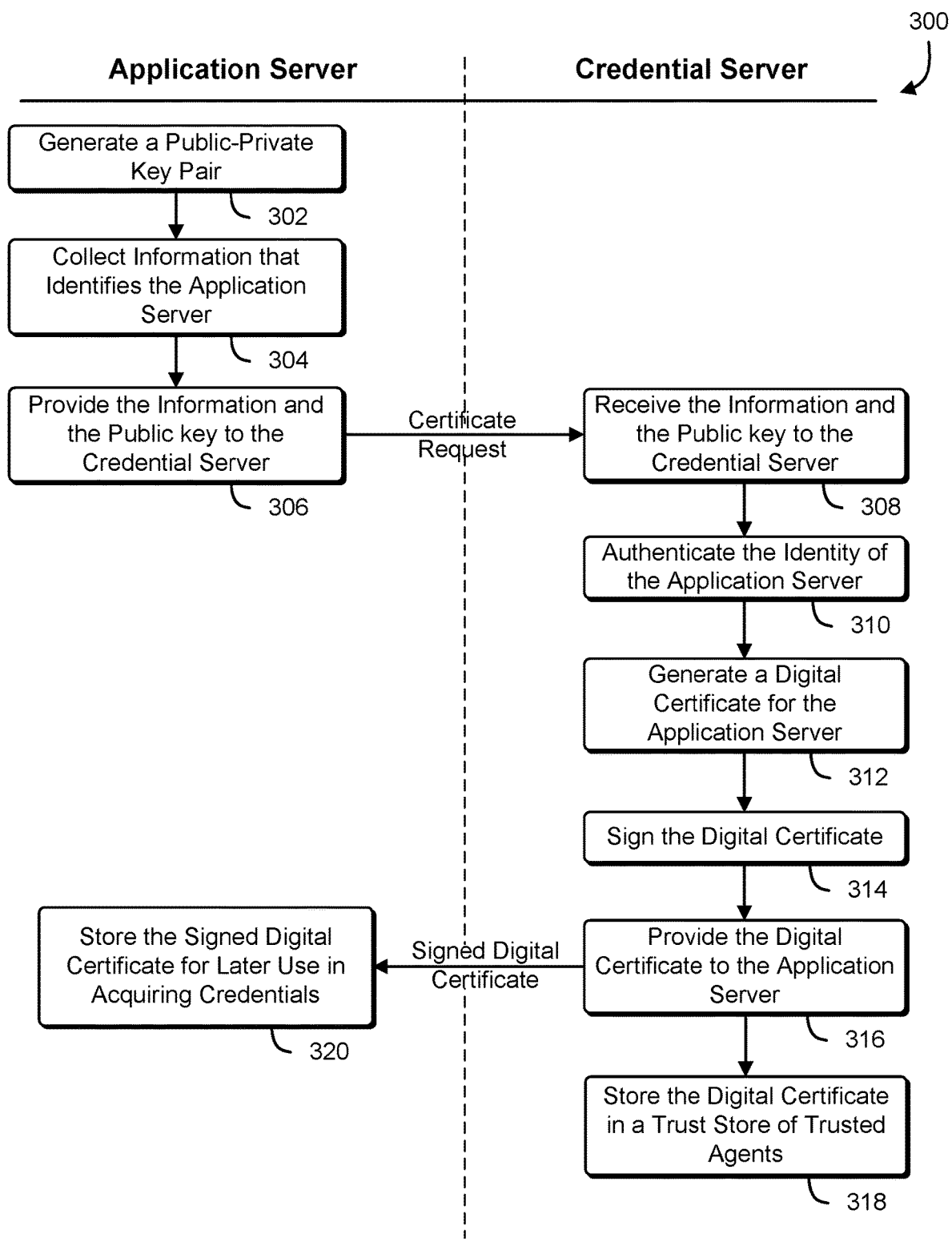
FIG. 3 shows an illustrative example of a process that, as a result of being performed by an application server and a credential server, registers an agent running on the application server as a trusted credential provider, in an embodiment.

FIG. 3 shows an illustrative example of a process 300 that, as a result of being performed by an application server and a credential server, registers an agent running on the application server as a trusted credential provider, in an embodiment. In an embodiment, the process begins at block 302 with an application server generating a public-private cryptographic key pair, such as an RSA key, a Lamport Key, or a Merkle signature scheme key. In an embodiment, at block 304, the application server collects information that identifies the application server. In an embodiment, the application server uses a trusted platform module to generate hash of the executable instructions associated with the agent, and the resulting hash is included in the information that identifies the application server. In an embodiment, the application server generates a fingerprint of the hardware configuration of the application server. In an embodiment, the fingerprint may be based on an amount of memory, characteristics of the processors in the application server, peripheral configurations of the application server, and storage devices connected to the application server. In an embodiment, the fingerprint is generated by a crypto processor installed on the application server. In an embodiment, the fingerprint and the hash of the agent instructions are signed with an attestation key by the trusted platform module. In an embodiment, at block 306, the application server provides the information and the public key to the credential server. In an embodiment, the information may be provided by sending the information over a computer network.

In an embodiment, at block 308, the credential server receives the information in the public key from the application server. In an embodiment, the information is received over an authenticated and encrypted TLS connection. In an embodiment, the credential server and/or the application server provide digital certificates to each other during the establishment of the TLS connection to confirm each other's identity. In an embodiment, at block 310, the credential server authenticates the identity of the application server. In an embodiment, the identity of the application server may be confirmed using a digital certificate provided by the application server, and account username and password provided with the information, a security token, or credential of a computing resource service provider. In an embodiment, at block 312, the credential server generates a digital certificate for use by the agent on the application server. In an embodiment, the digital certificate includes the identifying information provided by the application server. In an embodiment, the credential server identifies a security role based on the credentials provided to authorize the certificate request, and stores the digital certificate in association with the identified security role in a trust store on the credential server (or other storage device). In an embodiment, the security role defines a set of permissions for accessing a service provided by a computing resource service provider. In an embodiment, the security role is recorded in the digital certificate. In an embodiment, at block 314, the digital certificate is signed using a cryptographic key and is controlled by the credential server, such as a private key of a public-private key pair controlled by the credential server.

In an embodiment, at block 316, the credential server provides the digital certificate to the application server. In an embodiment, the digital certificate is provided by returning the digital certificate via the encrypted network connection over which the request was received. In an embodiment, the digital certificate is provided to a customer administrator, and the administrator provides the digital certificate to the application server on computer readable media, or via another transmission medium. In an embodiment, at block 318, the credential server stores the digital certificate in a trust store in association with the associated security role. In an embodiment, the trust store is a database containing a set of digital certificate-security role pairs that may be presented to the credential server to retrieve access credentials for a service of the computing resource service provider.

In an embodiment, at block 320, the application server acquires the signed digital certificate, and stores the digital certificate for later use. In an embodiment, the digital certificate is stored in an encrypted format by the agent using a cryptographic key generated and controlled by the agent. In an embodiment, the cryptographic key used to encrypt the digital certificate is stored in a hardware security module ("HSM"), trusted platform module, or crypto processor on the application server, thereby preventing the certificate from being used on another computer system.

Figure 4:
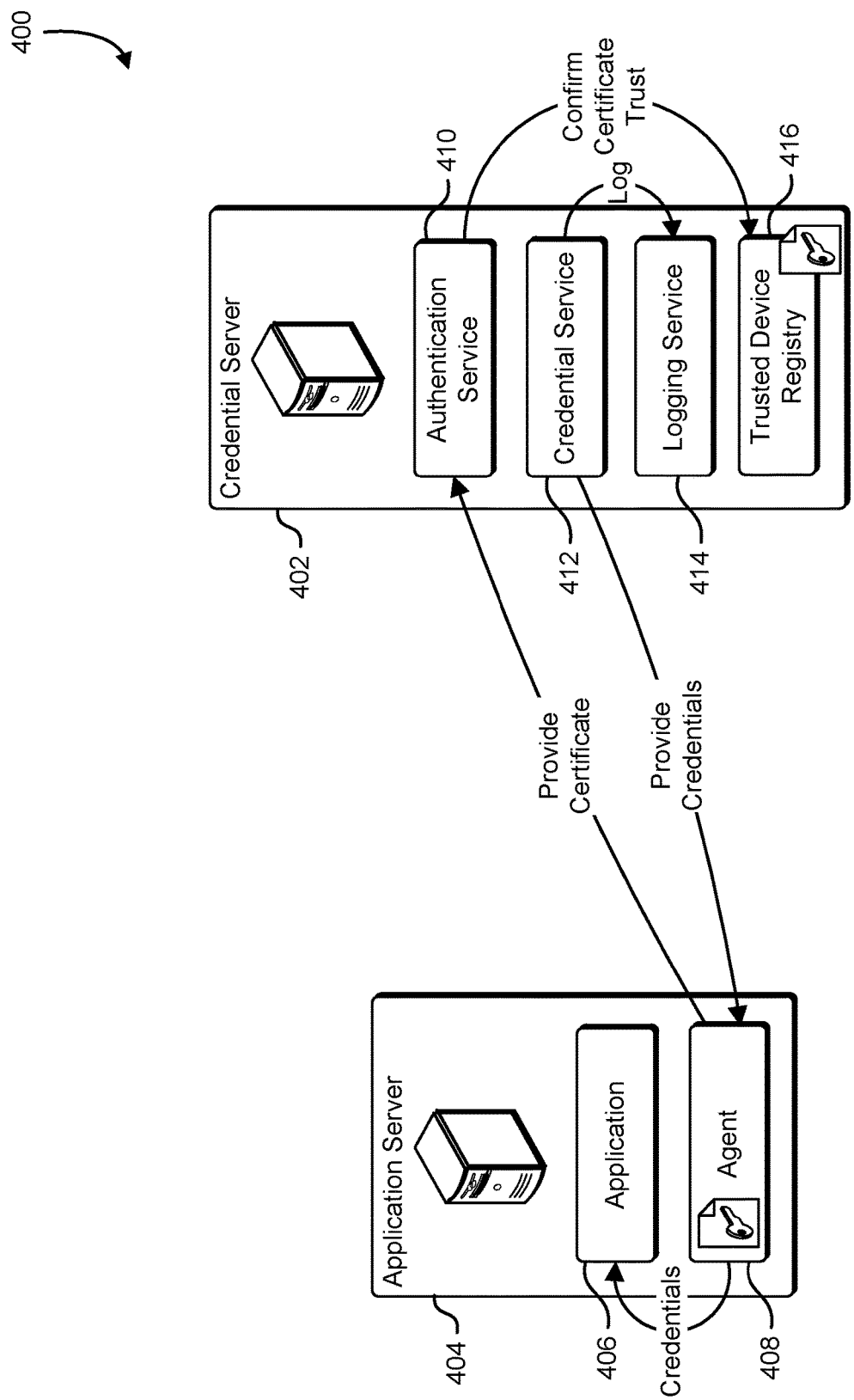
FIG. 4 shows an illustrative example of a system that provides temporary credentials to an application via a trusted agent running on an application server, in an embodiment.

FIG. 4 shows an illustrative example of a system 400 that provides temporary credentials to an application via a trusted agent running on an application server, in an embodiment. In an embodiment, the system 400 includes a credential server 402 and an application server 404. In an embodiment, the credential server 402 and the application server 404 may be any combination of a computer server, a server cluster, a virtual computer system, a runtime environment, or computing appliance having one or more processors and a memory for holding executable instructions that, when executed on the one or more processors, cause the server to perform various operations. In an embodiment, each server contains various groups of executable instructions that may be arranged according to the operations they cause the server to perform. In the present document, referring to a group of instructions as performing an operation is understood to mean that the group of instructions is executed on a processor, thereby causing a computer system to perform the recited operation.

In an embodiment, the application server 404 hosts an application 406 and an agent 408. In an embodiment, the application 406 is a set of instructions stored in a memory on the application server 404 by a customer, such as a customer application that performs business functions. In an embodiment, the agent 408 is a service installed on the application server 404 that communicates with the credential server 402 to retrieve credentials for use by the application 406. In an embodiment, the application server 404 resides on a customer network and the credential server 402 resides on a network controlled by computing resource service provider. In an embodiment, the agent 408 establishes communication with the credential server 402 via an intervening computer network such as the Internet. In an embodiment, communication between the agent 408 and the credential server 402 may be encrypted using the SSL or TLS protocol.

In an embodiment, the credential server 402 hosts an authentication service 410, a credential service 412, a logging service 414, and a trusted device registry 416. In an embodiment, the authentication service 410 is a set of computer instructions that cause the credential server 402 to verify the identity of the application server 404 via a digital signature, digital certificate, username and password, token, or other credential. In an embodiment, the credential service 412 is a set of computer instructions that cause the credential server 402 to generate credentials for a service of a computing resource service provider. In an embodiment, the credentials are a cryptographic key, token, short-term credential, or password that allows access to the service. In an embodiment, the logging service 414 records information describing operations performed by the authentication service 410, the credential service 412, and the trusted device registry 416. In an embodiment, the trusted device registry 416 records information that identifies the agent 408 and the application server 404. In an embodiment, the trusted device registry 416 includes information that identifies a security role or set of permissions that are granted to the agent 408. In an embodiment, information defining the security roles is stored in an authentication database maintained by the computing resource service provider. In an embodiment, assuming a security role is accomplished by at least authenticating the assuming entity to enable the system to determine that the entity is authorized to exercise the permissions associated with the security role.

In an embodiment, credentials for accessing a service of a computing resource service provider are acquired by the agent 408. In an embodiment, the agent 408 retrieves the digital certificate acquired as part of the registration process. In an embodiment, the digital certificate is stored in an encrypted form, and is decrypted using a cryptographic key accessible to the agent 408. In an embodiment, the digital certificate is transmitted over a computer network to the authentication service 410 on the credential server 402. In an embodiment, the authentication service 410 confirms that the digital certificate is represented in the trusted device registry 416, and identifies the security role with which the digital certificate is associated. In an embodiment, the credential service 412 generates a credential in accordance with the security role that allows the holder of the credential to access the service on the computing resource service provider. In an embodiment, the credentials provided by the credential service 412 are generated so that only requests that originate from the application server 404 are granted. In an embodiment, the credential is a short-term cryptographic key that may be used to sign service requests. In an embodiment, generation of the credential and authentication of the request are recorded by the logging service 414. In an embodiment, the credentials are returned from the credential service 412 to the agent 408.

In an embodiment, the agent 408 stores the credentials in an environment variable, a shared storage location, or registry that is accessible by the application 406. In an embodiment, the application 406 is able to access the credentials when generating requests to the service of the computing resource service provider.

Figure 5:
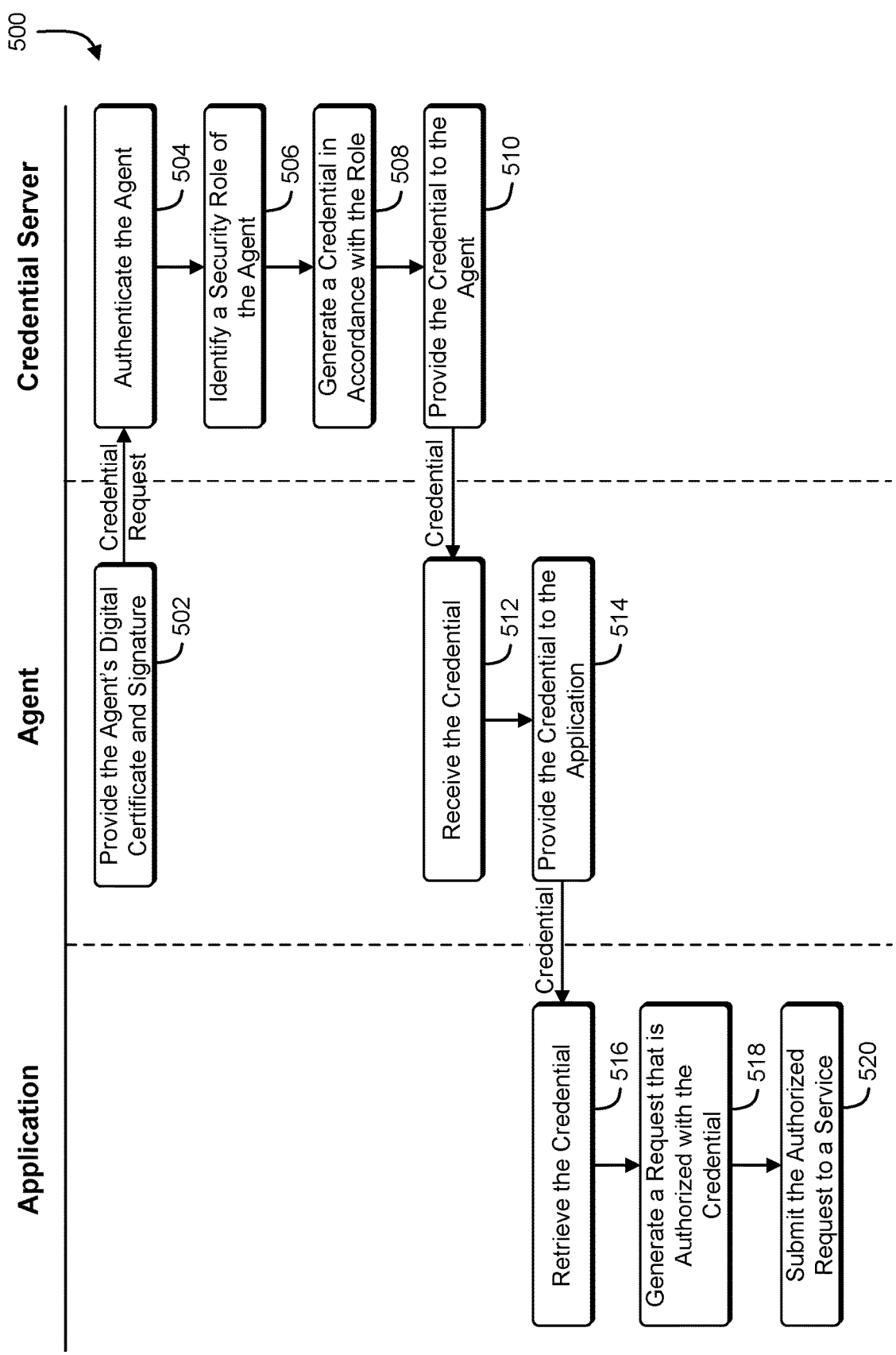
FIG. 5 shows an illustrative example of a process that, as a result of being performed by an application, an agent, and a credential server, provides credentials to the application that allow the application to access a service provided by a computing resource service provider, in an embodiment.

FIG. 5 shows an illustrative example of a process 500 that, as a result of being performed by an application, an agent, and a credential server, provides credentials to the application that allow the application to access a service provided by a computing resource service provider, in an embodiment. In an embodiment, the process begins at block 502 with an agent providing the agent's digital certificate and signature to the credential server. In an embodiment, the credential server provides a random challenge value, and the agent signs the challenge value with a private key associated with a public key present in the digital certificate. In an embodiment, the digital certificate is provided as part of establishing a TLS handshake.

In an embodiment, at block 504, the credential server receives the credential request with a signed digital certificate, and authenticates the agent. In an embodiment, the agent as authenticated by validating the digital signature provided by the agent matches a public key in the digital certificate. In an embodiment, the credential server validates a digital signature on the digital certificate using a public key of the agent. In an embodiment, the two digital signatures confirm that the provider of the digital certificate is in possession of the private key associated with the digital certificate and that the digital certificate is one that was generated by the credential server. In an embodiment, the agent provides a device profile to the credential server, and the credential server confirms the device profile matches one contained in the digital certificate. In an embodiment, the device profile may be information describing properties of the application server on which the agent resides. In an embodiment, this information may be signed by a trusted platform module. In an embodiment, at block 506, the credential server locates a matching digital certificate in a trust store, and retrieves a security role associated with the digital certificate. In an embodiment, if the digital certificate is not located in the trust store, the credential request is rejected. In an embodiment, at block 508, the credential server generates a credential for use by the agent. In an embodiment, the credential is a token, key, or password that allows access to a service of a computing resource service provider. In an embodiment, the credential limits the allowable service requests to those that originate from the application server, or computer systems on a specified subnet. In an embodiment, at block 510, the credential server provides the credential to the agent.

In an embodiment, 512, the agent receives the credential from the credential server and stores the credential in a registry, shared storage location, or environment variable that is accessible to one or more applications or services hosted on the application server. In an embodiment, the credential is published so that the credential is accessible to a set of computer systems specified by the customer. In an embodiment, at block 514, the credential is provided to the application.

In an embodiment, at block 516, the application retrieves the credential from the environment variable, registry, or publication point. In an embodiment, at block 518, the application generates a service request for a service provided by a computing resource service provider. In an embodiment, to authorize the request, the application generates a digital signature based on the credential and adds the digital signature to the request. In an embodiment, the credential is added to the request to authorize the request. In an embodiment, at block 520, the authorized request is transmitted to the service, and if the request is approved by the service, the service performs the request.

In an embodiment, prior to the expiration of the credentials, the agent may request updated credentials from the credential server by presenting the digital certificate. In an embodiment, the updated credentials are returned to the agent and provided to the application through an environment variable or other mechanism described herein.

Figure 6:
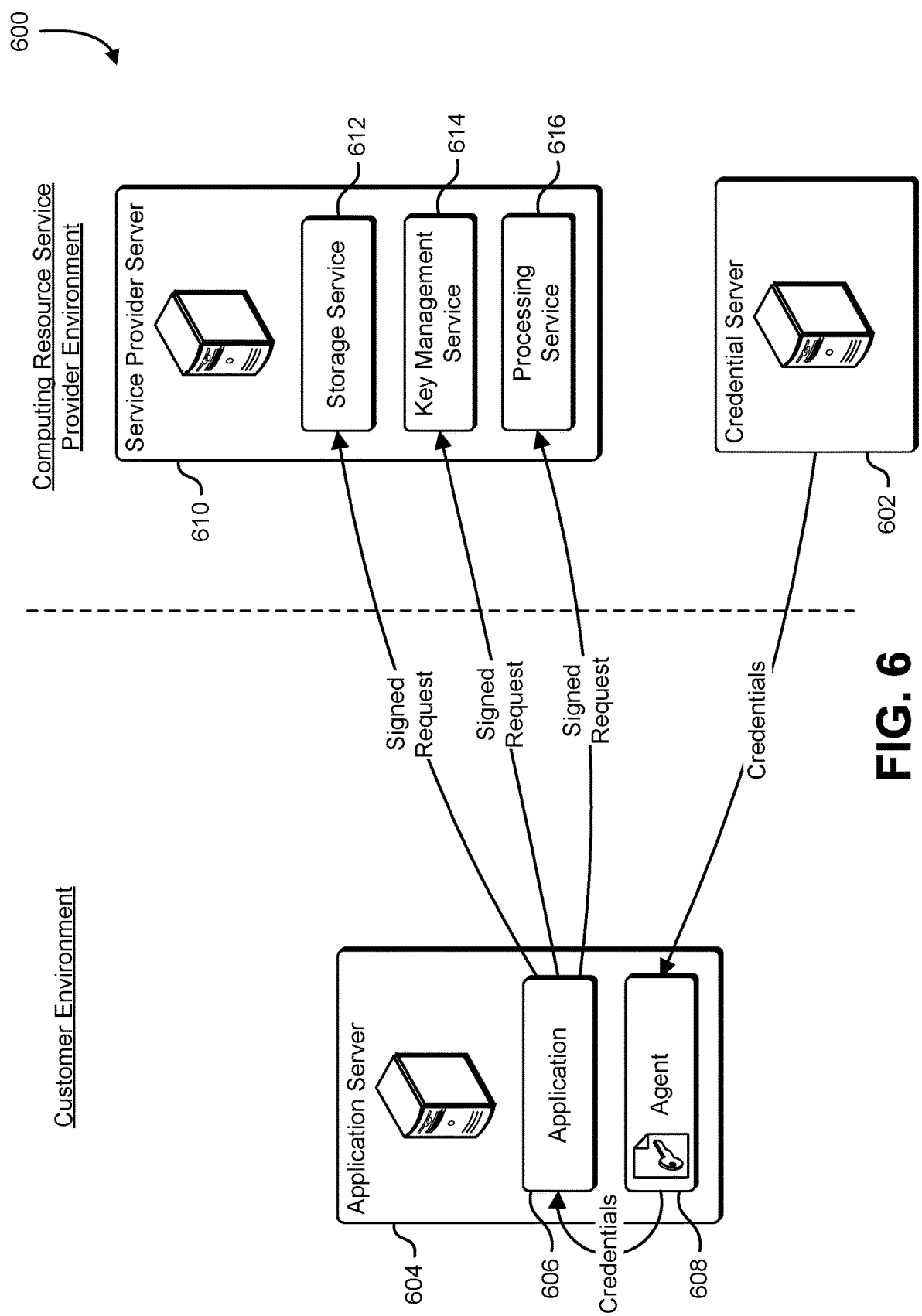
FIG. 6 shows an illustrative example of an application making service requests using credentials provided by a credential server via an agent running on an application server, in an embodiment.

FIG. 6 shows an illustrative example of an application making service requests using credentials provided by a credential server via an agent running on an application server, in an embodiment. In an embodiment, a system 600 includes a credential server 602 and an application server 604. In an embodiment, the credential server 602 and the application server 604 may be any combination of a computer server, a server cluster, a virtual computer system, a runtime environment, or computing appliance having one or more processors and a memory for holding executable instructions that, when executed on the one or more processors, cause the server to perform various operations. In an embodiment, each server contains various groups of executable instructions that may be arranged according to the operations they cause the server to perform. In the present document, referring to a group of instructions as performing an operation is understood to mean that the group of instructions is executed on a processor, thereby causing a computer system to perform the recited operation.

In an embodiment, the application server 604 hosts an application 606 and an agent 608. In an embodiment, the application 606 is a set of instructions stored in a memory on the application server 604 by a customer, such as a customer application that performs business functions. In an embodiment, the agent 608 is a service installed on the application server 604 that communicates with the credential server 602 to retrieve credentials for use by the application 606. In an embodiment, the application server 604 resides on a customer network and the credential server 602 resides on a network controlled by computing resource service provider. In an embodiment, the agent 608 establishes communication with the credential server 602 via an intervening computer network such as the Internet. In an embodiment, communication between the agent 608 and the credential server 602 may be encrypted using the SSL or TLS protocol.

In an embodiment, the system includes a service provider server 610. In an embodiment, the service provider server 610 is a computer server, server cluster, virtual computer system, or computing appliance operated by computing resource service provider for the purpose of providing one or more services to customers of the computing resource service provider. In an embodiment, customer applications running both inside and outside the computing resource service provider environment may access the services hosted by the service provider server 610. In an embodiment, the service provider server hosts a storage service 612, a key management service 614, and processing service 616. In an embodiment, each service provides a web interface to customer applications for accessing the service. In an embodiment, service requests provided by applications are authenticated using credentials acquired by the customer of the computing resource service provider.

In an embodiment, credentials are provided by the credential server 602 to the agent 608 running on the application server 604. In an embodiment, the agent 608 stores the credentials in an environment variable, registry, or shared memory that is accessible to the application 606. In an embodiment, the application generates one or more service requests for the services provided by the service provider server 610. In an embodiment, the application 606 retrieves the credentials made available by the agent 608, and uses the credentials to authorize the requests submitted to the service provider server 610. In an embodiment, the various services hosted on the service provider server 610 verify the credentials provided by the application. In an embodiment, if the credentials are not valid or are expired, the request is rejected by the service and the application 606 requests updated credentials from the agent. In an embodiment, when the agent receives a request for updated credentials from an application, the agent requests updated credentials from the credential server 602 using the process described above.

Figure 7:
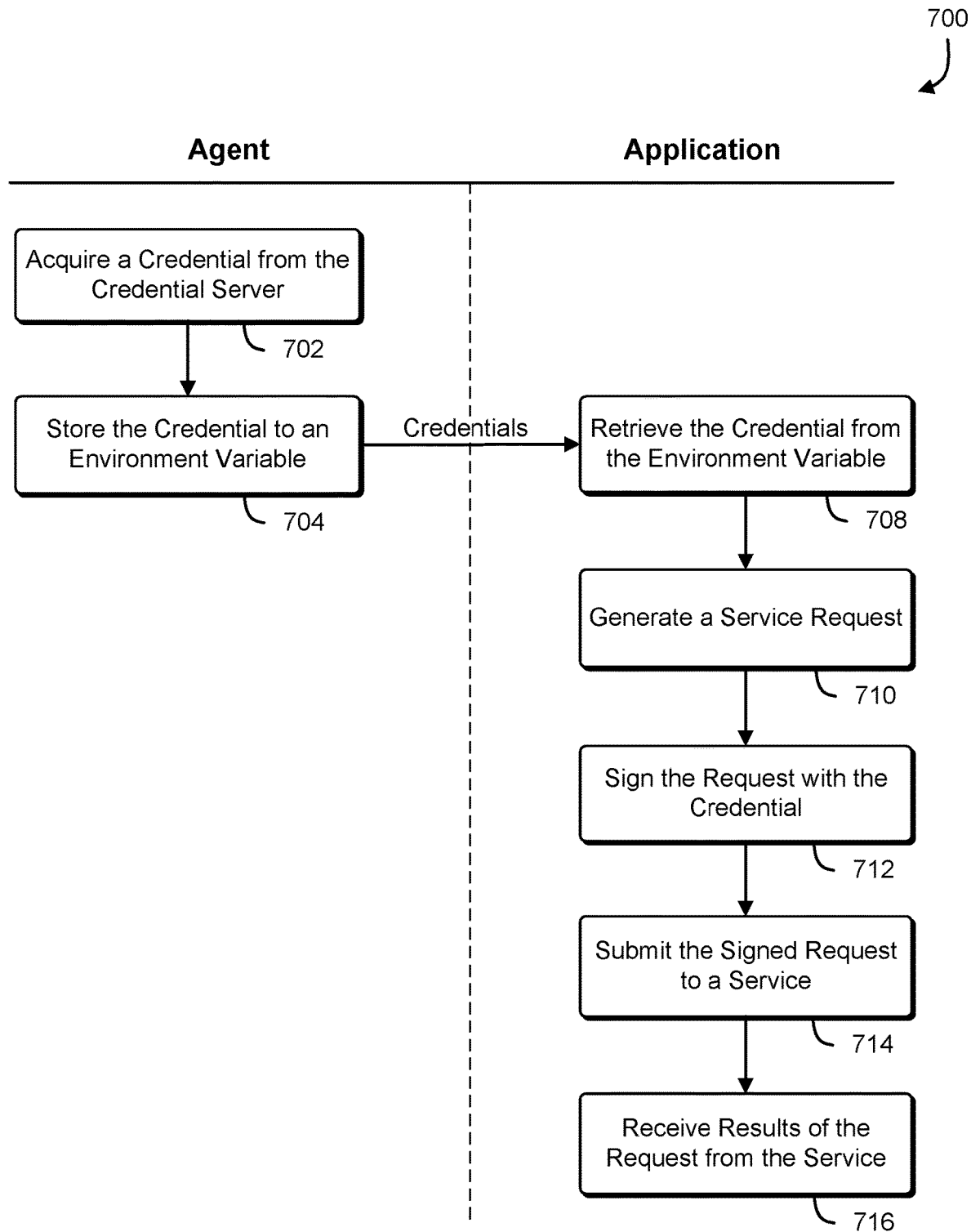
FIG. 7 shows an illustrative example of a process that, as a result of being performed by an agent and an application, submits a service request using a credential provided by the agent, in an embodiment.

FIG. 7 shows an illustrative example of a process 700 that, as a result of being performed by an agent and an application, submits a service request using a credential provided by the agent, in an embodiment. In an embodiment, the process begins at block 702 with an agent acquiring a credential for a credential server. In an embodiment, the credentials acquired in accordance with a process described above. In an embodiment, at block 704, the agent stores the credential into an environment variable that is accessible to the application. In an embodiment, the credential may be stored to a configuration file, a shared memory, a location on disk, or a registry that is accessible to the application.

In an embodiment, at block 708, the application retrieves the credentials from the location used by the agent. In an embodiment, at block 710, the application generates a service request for service of a computing resource service provider. In an embodiment, the service request is a request to store data, an encryption request, a key management request, a function execution request, or a request for virtual computing resources. In an embodiment, at block 712, the application uses the credential to authorize the request. In an embodiment, the credential is a cryptographic key and the application uses the cryptographic key to generate the signature that authorizes the request. In an embodiment, the credential is a token or password that is included with the request to authorize the request. In an embodiment, at block 714, the application submits the authorized request to the service. In an embodiment, the service is accessible via a web interface and the request is submitted to the service over a computer network as a web service call. In an embodiment, at block 716, the service returns results of the request to the application. In an embodiment, the results may include an indication that the credential is expired or invalid. In an embodiment, if the results include an indication that the credential is expired, the application provides the indication to the agent causing the agent to acquire an updated credential which is stored in the environment variable or other accessible storage location.

Figure 8:
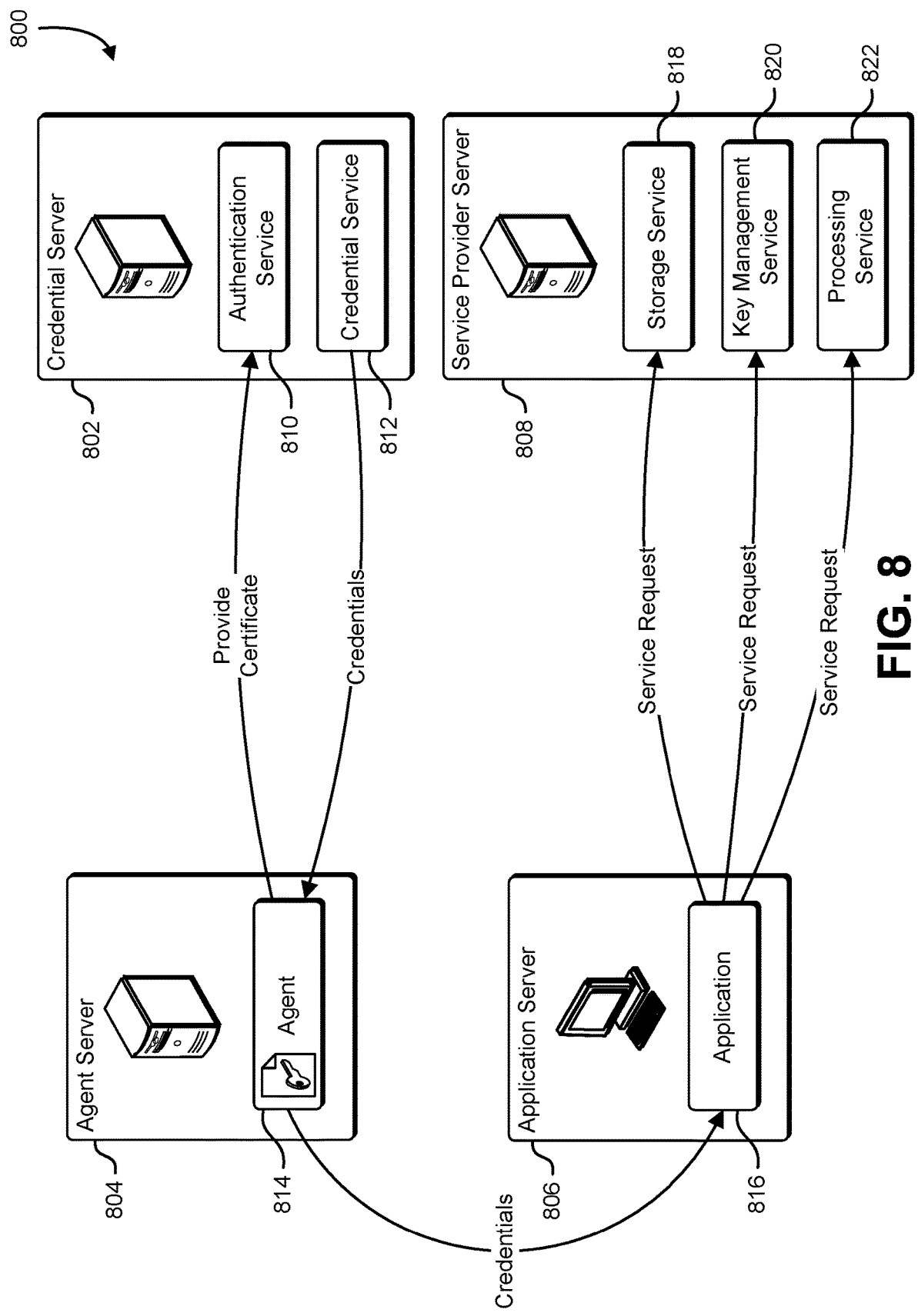
FIG. 8 shows an illustrative example of a system that provides credentials to an application running on an application server via an agent running on an agent server, in an embodiment.

FIG. 8 shows an illustrative example of a system 800 that provides credentials to an application running on an application server via an agent running on an agent server, in an embodiment. In an embodiment, the system includes a credential server 802, an agent server 804, an application server 806, and a service provider server 808. In an embodiment, the credential server 802, the agent server 804, the application server 806, and the service provider server 808 may be any combination of a computer server, a server cluster, a virtual computer system, a runtime environment, or computing appliance having one or more processors and a memory for holding executable instructions that, when executed on the one or more processors, cause the server to perform various operations. In an embodiment, each server contains various groups of executable instructions that may be arranged according to the operations they cause the server to perform. In the present document, referring to a group of instructions as performing an operation is understood to mean that the group of instructions is executed on a processor, thereby causing a computer system to perform the recited operation.

In an embodiment, the credential server 802 hosts an authentication service 810 and a credential service 812. In an embodiment, the authentication service 810 is a set of computer instructions that cause the credential server 802 to verify the identity of the application server 806 via a digital signature, digital certificate, username and password, token, or other credential. In an embodiment, the credential service 812 is a set of computer instructions that cause the credential server 802 to generate credentials for a service of a computing resource service provider. In an embodiment, the credentials are a cryptographic key, token, short-term credential, or password that allows access to the service.

In an embodiment, the agent server 804 hosts an agent 814. In an embodiment, the agent 814 is a service installed on the agent server 804 that communicates with the credential server 802 to retrieve credentials for use by the application 816. In an embodiment, the application server 806 resides on a customer network and the credential server 802 resides on a network controlled by computing resource service provider. In an embodiment, the agent 814 establishes communication with the credential server 802 via an intervening computer network such as the Internet. In an embodiment, communication between the agent 814 and the credential server 802 may be encrypted using the SSL or TLS protocol.

In an embodiment, the application server 806 hosts an application 816. In an embodiment, the application 816 is a set of instructions stored in a memory on the application server 806 by a customer. In an embodiment, the application server 604 resides on a customer network and the credential server 802 resides on a network controlled by computing resource service provider.

In an embodiment, the system includes a service provider server 808. In an embodiment, the service provider server 808 is a computer server, server cluster, virtual computer system, or computing appliance operated by computing resource service provider for the purpose of providing one or more services to customers of the computing resource service provider. In an embodiment, customer applications running both inside and outside the computing resource service provider environment may access the services hosted by the service provider server 808. In an embodiment, the service provider server hosts a storage service 818, a key management service 820, and processing service 822. In an embodiment, each service provides a web interface to customer applications for accessing the service. In an embodiment, service requests provided by applications are authenticated using credentials acquired by the customer of the computing resource service provider.

In an embodiment, credentials are provided to an application running on a server separate from the server that hosts the agent 814. In an embodiment, the agent provides its digital certificate to the authentication service 810, and in response, receives a set of credentials from the credential service 812. In an embodiment, the credentials allow the holder to access a service provided by the service provider server 808. In an embodiment, the agent stores the credentials in a location that can be accessed via the application server 806. In an embodiment, the location is a network-accessible registry, network-accessible shared storage volume, or network database. In an embodiment, the agent 814 makes the credentials available via a network interface, and applications may request the credentials using an authenticated web service interface from the agent 814.

In an embodiment, the application 816 generates one or more service requests for services provided by the service provider server 808. In an embodiment, the application 816 retrieves the credentials using the mechanism described above, and uses the credentials to authorize each request. In an embodiment, the requests are submitted to the services provided by the service provider server 808.

Figure 9:
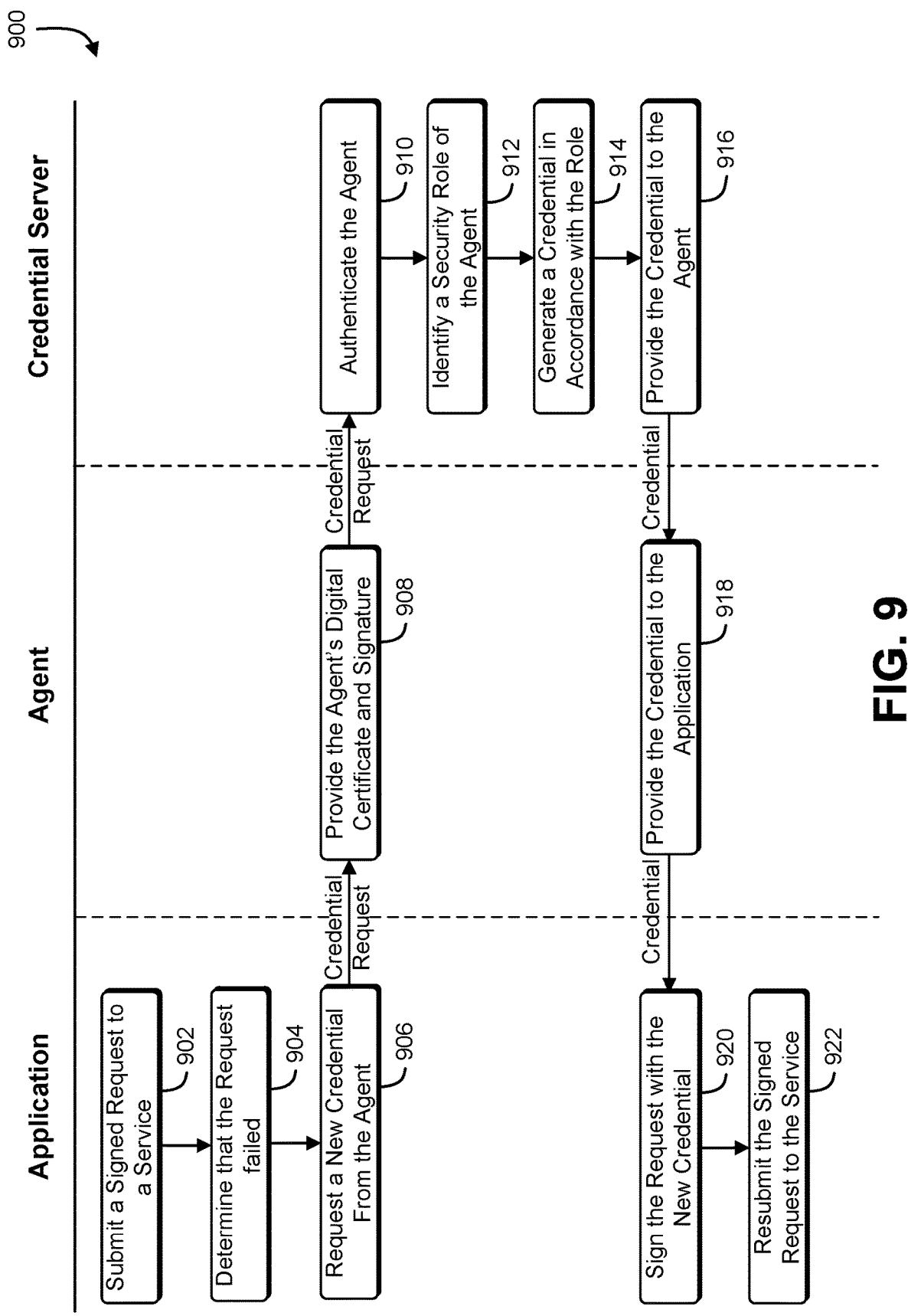
FIG. 9 shows an illustrative example of a process that, as a result of being performed by an application, an agent, and a credential server, renews a credential in response to a failed service request, in an embodiment.

FIG. 9 shows an illustrative example of a process 900 that, as a result of being performed by an application, an agent, and a credential server, renews a credential in response to a failed service request, in an embodiment. In an embodiment, the process begins at block 902 with applications submitting a request authorized for the credential to a service offered by a computing resource service provider. In an embodiment, at block 904, the application receives a response from the service that the request has failed due to an invalid credential. In an embodiment, a credential may fail to authorize a request due to the credential being expired, revoked, or invalid. In an embodiment, at block 906, the application sends a request for a new credential to the agent, which has been previously registered with the credential server.

In an embodiment, the agent receives the request from the application, and generates a request for a new credential. In an embodiment, the request for a new credential includes a digital certificate, a signature of the agent, and information that describes the computer system on which the agent is running. In an embodiment, the information includes network address information, a network hardware address, a processor ID, and system configuration information. In an embodiment, the request is submitted 908 to the credential server.

In an embodiment, at block 910, the credential server receives the request for a new credential and authenticates the request by confirming that the digital certificate is properly signed by the credential server and the agent, and that the information describing the computer system on which the agent is hosted matches information contained in the digital certificate. In an embodiment, at block 912, the credential server identifies a security role associated with the certificate provided with the request. In an embodiment, at block 914, the credential server generates a credential in accordance with the identified security role that grants permission to use a service of a computing resource service provider. In an embodiment, at block 916, the credential server provides the new credential to the agent.

In an embodiment, at block 918, the agent receives the updated credential from the credential server. In an embodiment, the agent stores the updated credential in a memory location accessible to the application such as an environment variable, configuration database, or registry. In an embodiment, at block 920, the application retrieves the credential from the location and uses the new credential to authorize the request that previously failed. In an embodiment, at block 922, the application submits the request to the service, authorized with the new credential.

In an embodiment, the Agent determines that the credential is about to expire, and requests an updated credential from the credential server. In an embodiment, the Agent stores the updated credential, overwriting the credential that is about to expire. In an embodiment, applications using the previous credential may continue to use the credential until it expires. In an embodiment, when an application determines that a credential has expired, it retrieves the updated credential from the environment variable or other storage location.

In an embodiment, the credential server may revoke a certificate previously issued to an agent. In an embodiment, the digital certificate is revoked by removing the digital certificate from a trust store. In an embodiment, credential requests received from the agent associated with the digital certificate are denied after the agent's certificate is revoked.

Figure 10:
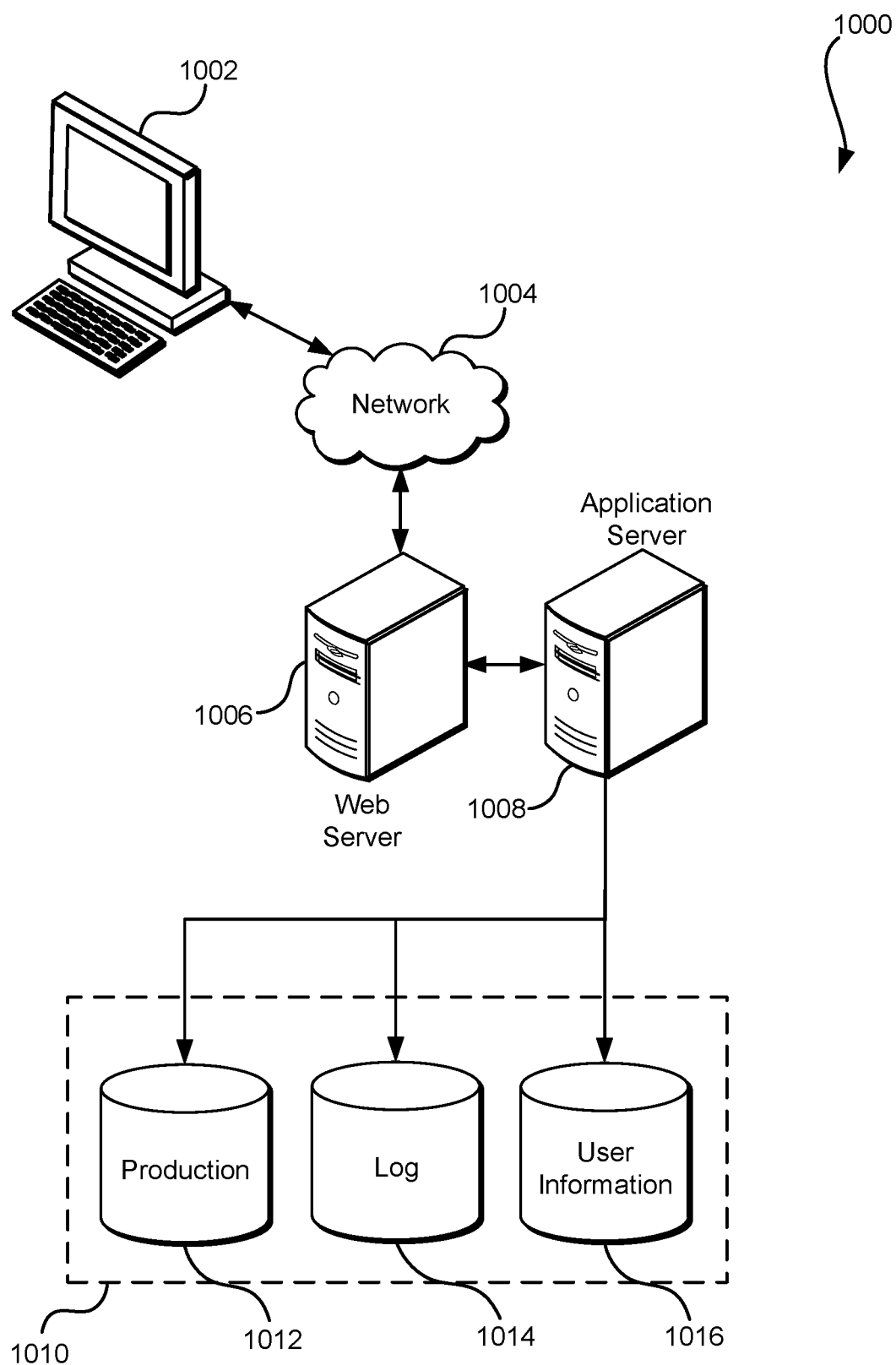
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 1002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a digital certificate to enable authentication of a client system;
   in response to authenticating the client system, sending a set of credentials to the client system wherein the set of credentials corresponds to one or more security roles associated with the digital certificate, and wherein the set of credentials are valid for an amount of time less than an amount of time for which the digital certificate is valid;
   providing the set of credentials to an application to enable the application to access a service using the set of credentials; and
   determining that the set of credentials is going to expire within a threshold amount of time.

2. The computer-implemented method of claim 1, further comprising:
   generating a new set of credentials; and
   providing the new set of credentials to the application.

3. The computer-implemented method of claim 1, wherein the digital certificate is cryptographically bound to the client system by at least:
   acquiring information that describes a characteristic of the client system; and
   generating the digital certificate based on the information.

4. The computer-implemented method of claim 1, wherein the set of credentials are provided to the application by storing the set of credentials to an environment variable accessible to the application.

5. A system, comprising:
   one or more processors; and
   memory that stores computer-executable instructions that, if executed, cause the system to:
     receive a digital certificate from a computer system;
     determine that the digital certificate is valid;
     determine that a characteristic of the computer system matches a characteristic of the computer system described in the digital certificate;
     determine that a digital signature generated with a cryptographic key of a trusted platform module is valid;
     generate a set of credentials that enable access to a service in accordance with a security role associated with the digital certificate; and
     provide, to the computer system, the set of credentials.

6. The system of claim 5, wherein the computer-executable instructions further cause the system to:
   acquire a public key and information that describes a characteristic of a computer system; and
   generate a digital certificate based on the information and the public key.

7. The system of claim 5, wherein the computer-executable instructions further cause the system to:
   receive, from the computer system, information describing a characteristic of the computer system, the information including the digital signature generated with the cryptographic key of the trusted platform module; and
   determine that the information is in accordance with the digital certificate.

8. The system of claim 5, wherein the set of credentials is provided by at least storing the set of credentials to a registry accessible by the computer system.

9. The system of claim 5, wherein the computer-executable instructions further cause the system to:
   determine that the set of credentials is expired;
   generate an updated set of credentials; and
   provide, to the computer system, the updated set of credentials.

10. The system of claim 5, wherein the digital certificate is provided to the system as part of a transport layer security handshake that establishes an encrypted authenticated communication channel between the system and the computer system.

11. The system of claim 5, wherein the set of credentials includes a cryptographic key that is able to be used to generate a digital signature that authorizes a call to a web service.

12. The system of claim 5, wherein the security role identifies a set of access permissions for a service.

13. A non-transitory computer-readable storage medium storing executable instructions that, as a result of being executed by one or more processors of a computer system, cause the computer system to at least:
   provide, to a server, a characteristic of the computer system and a digital signature of executable instructions associated with an agent hosted by the computer system;
   receive a set of credentials from a server, the set of credentials granting access to a service based on a security role associated with the digital signature;
   provide the set of credentials; and
   provide a new set of credentials based at least in part on the set of credentials being unusable.

14. The non-transitory computer-readable storage medium of claim 13, wherein the instructions further comprise instructions that, as a result of being executed by the one or more processors, cause the computer system to:
   determine that the set of credentials is going to be unusable;
   transmit a request for the new set of credentials to the server; and
   receive the new set of credentials.

15. The non-transitory computer-readable storage medium of claim 13, wherein the instructions further comprise instructions that, as a result of being executed by the one or more processors, cause the computer system to:
   receive, from an application, an indication that the set of credentials is not valid;

transmit a request for a new set of credentials to the server;

receive the new set of credentials; and provide the new set of credentials.

16. The non-transitory computer-readable storage medium of claim 13, wherein the instructions further include instructions that cause the computer system to:

generate a digital signature of executable instructions associated with an agent hosted by the computer system; and provide the digital signature to the server.

17. The non-transitory computer-readable storage medium of claim 16, wherein the digital signature is generated with a cryptographic key stored on a cryptoprocessor.

18. The non-transitory computer-readable storage medium of claim 13, wherein:

the digital certificate describes the characteristic of the computer system; and the digital certificate is signed using a cryptographic key controlled by the server.

19. The non-transitory computer-readable storage medium of claim 13, wherein the credentials are provided by at least storing the credentials in a memory location accessible to a set of applications running on the computer system.

20. The non-transitory computer-readable storage medium of claim 19, wherein the memory location is a registry or configuration file.

21. The computer-implemented method of claim 1, wherein the threshold amount of time that the set of credentials is going to expire within is a defined non-zero amount of time from a time when the set of credentials are going to expire.

* * * * *